United States Patent [19]
Stroomer

[11] Patent Number: 5,267,045
[45] Date of Patent: Nov. 30, 1993

[54] MULTI-STANDARD DISPLAY DEVICE WITH SCAN CONVERSION CIRCUIT

[75] Inventor: Martinus V. C. Stroomer, Eindhoven, Netherlands

[73] Assignee: U.S. Philips Corporation, New York, N.Y.

[21] Appl. No.: 916,449

[22] Filed: Jul. 17, 1992

[30] Foreign Application Priority Data

Jul. 19, 1991 [EP] European Pat. Off. ......... 91201900.7

[51] Int. Cl.$^5$ .............................................. A04N 5/70
[52] U.S. Cl. ..................................... 358/241; 358/140
[58] Field of Search ............... 358/140, 241, 160, 180, 358/148, 152; 340/784

[56] References Cited

U.S. PATENT DOCUMENTS

| | | | |
|---|---|---|---|
| 3,342,937 | 9/1967 | Deutsch | 358/138 X |
| 4,694,348 | 9/1987 | Kamiya et al. | 358/241 X |
| 4,989,092 | 1/1991 | Doyle et al. | |
| 5,091,784 | 2/1992 | Someya et al. | 358/183 |

FOREIGN PATENT DOCUMENTS 04002806 3/1990 European Pat. Off. .

Primary Examiner—Victor R. Kostak
Attorney, Agent, or Firm—Robert J. Kraus

[57] ABSTRACT

A multi-standard display device having a liquid crystal display screen has so far only been realized by using all kinds of interpolation techniques. To make the number of rows and columns of the display screen independent of the incoming video signal and yet provide the possibility of displaying the various television standards without any disturbing errors, the incoming video signal is applied to the display screen via a scan-conversion circuit. The scan-conversion circuit reads in the video information in a first direction and subsequently reads it out in a second direction perpendicular to the first direction, for example, with storage in a memory. The video information is subsequently applied in the second direction to the row driver of the display screen, which row driver applies the video information to the display screen per column and under the control of the column driver.

8 Claims, 2 Drawing Sheets

MULTI-STANDARD DISPLAY DEVICE WITH SCAN CONVERSION CIRCUIT

BACKGROUND OF THE INVENTION

The invention relates to a multi-standard display device for displaying pictures having a television-standard-dependent format, which device comprises a matrix display screen (such as a liquid-crystal display), a video signal processing circuit for receiving and processing the pictures, said pictures having a format-associated number of lines in a first direction, a sync separator for determining horizontal and vertical synchronizing signals and a standard-conversion circuit for converting the pictures of the television-standard-dependent format into pictures having a display screen-associated format.

A multi-standard display device of this type is known from European Patent Application EP-A-400286. A multi-standard display device is understood to mean a display device which is suitable for a plurality of television standards (PAL, NTSC, HDTV, etc.). Since a display device with a liquid crystal display screen (LCD) has a fixed number of display lines, the incoming video signal will have to be converted to a picture having a fixed number of display lines (viz. the number of display lines of the LCD screen) so as to ensure that the display device is suitable for, for example, both PAL (625 lines) and NTSC (525 lines).

In this known display device the lines which are absent (due to interlacing) are firstly inserted by means of interpolation after the incoming video signal has been stored line by line in the memory, and subsequently a vertical interpolation is performed, if necessary, in order to obtain the required number of lines (of the display screen).

A drawback of this known multi-standard display device is that the vertical interpolation is complicated and hence costly. Each pixel of each interpositioned line must be computed.

SUMMARY OF THE INVENTION

It is inter alia an object of the invention to provide a multi-standard display device which is capable of displaying video information of a variable format on one and the same LCD display screen and which is simpler and hence less expensive than the known multi-standard display devices. To this end the multi-standard display device according to the invention is characterized in that the standard-conversion circuit comprises a scan-conversion circuit for converting pictures having lines in the first direction into lines in a second direction perpendicular to the first direction, said second-direction lines being applied to the display screen and being displayed in the second direction under the control of a control circuit.

A cathode ray tube (CRT) display device in which the lines are written vertically instead of horizontally is known from U.S. Pat. No. 4,989,092. The reason of displaying the lines vertically on a CRT display screen is that the deflection is effected at the fastest rate, (namely the line rate) into the direction having the smallest deflection angle and hence the smallest amplitude. Consequently, there is a considerable reduction of the energy dissipation. This aspect will become increasingly more important as display devices get bigger, and certainly also for 16:9 display devices.

In display devices having an LCD screen this dissipation aspect does not play a role and the decision to reverse the scanning directions will not be rapidly made because this directly necessitates a memory.

The problem of the fixed position of the lines does not exist in display devices having a CRT screen because the line position in a CRT screen can be freely chosen by means of the deflection unit.

An embodiment of a multi-standard display device according to the invention is characterized in that the scan-conversion circuit comprises a memory which reads in the pictures line by line in the first direction under the control of a first clock signal and reads them out in the direction perpendicular to the first direction under the control of a second clock signal.

Reading in and reading out with (possibly) different clock signals provides the freedom of enlarging, for example, a part of the picture, which will often be necessary because the number of pixels per line and the number of lines of a picture are not equal.

A further embodiment of a multi-standard display device according to the invention is characterized in that the control circuit comprises a row driver and a column driver, said row driver receiving the video information in an analog form with lines in the second direction, a third clock signal controlling said row driver and a fourth clock signal controlling said column driver.

In the conventional display devices having a liquid crystal display screen the video information is applied to the column driver of the control circuit and by means of a clock signal it is determined at which instant the next line must be written on the liquid crystal display screen. Since in multi-standard display devices according to the invention the lines are read from the memory in a direction perpendicular to the read-in direction, it is advantageous to apply the video information to the row driver instead of to the column driver.

BRIEF DESCRIPTION OF THE DRAWING

The invention will be described in greater detail with reference to the accompanying drawing figures in which.

DESCRIPTION OF THE PREFERRED EMBODIMENT

Figure 1:
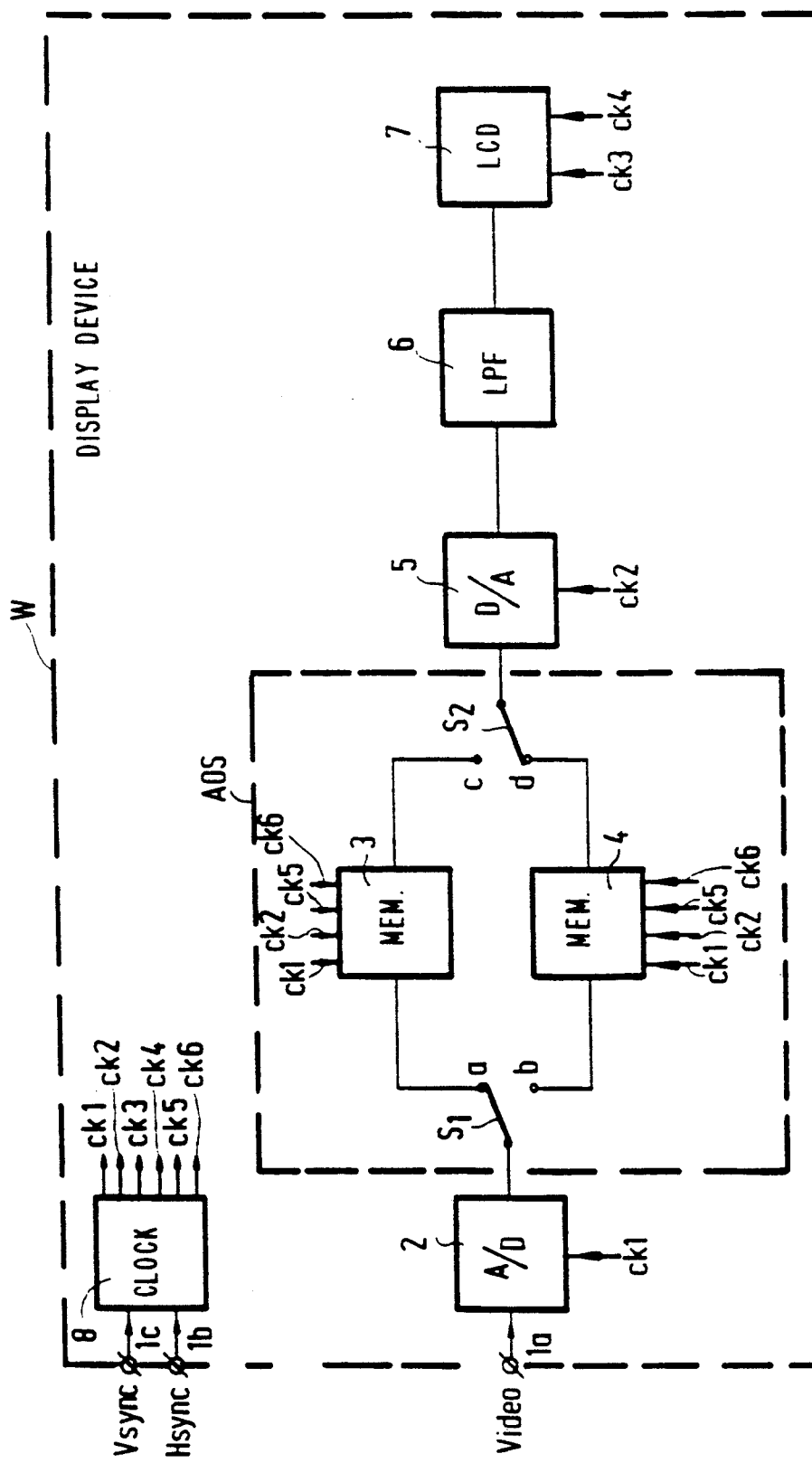
FIG. 1 shows an embodiment of a multi-standard display device according to the invention.
Figure 2A:
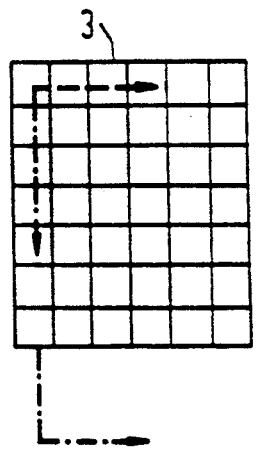
FIGS. 2A and 2B show diagrammatically the way in which the memories according to the invention are read in and read out.

FIG. 1 shows an embodiment of a display device W in which the video signal, a horizontal synchronizing signal Hsync and a vertical synchronizing signal Vsync are received at inputs 1a, 1b and 1c, respectively. The input 1a is coupled to an A/D converter 2 which takes samples of the video signal under the control of a first clock signal ck1. The output signal of the A/D converter is applied to the master contact of a switch S1, a first switching contact a of which is connected to a memory 3. The samples of a first field of the video signal are stored in the memory 3 (see the dashed line in FIG. 2A) under the control of clock signals. The memory has an internal structure of a matrix and is filled row by row with video information. The clock signal ck1 determines the allocation of memory elements in a row, while a clock signal ck5 determines the row drive of the memory.

Figure 2B:
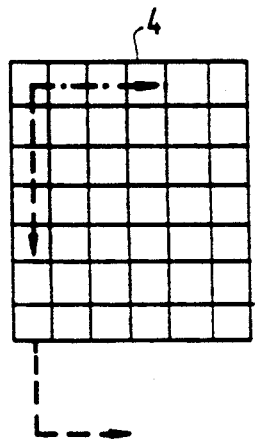

After the first field of the video signal has been read into the memory 3 in the manner stated above, the switch S1 is changed over (from switching contact a to switching contact b) and the second field is read row by row into a memory 4 (see the dot-dash line in FIG. 2B). The memory 4 is also controlled by clock signals, the clock signal ck1 again determining the allocation of the memory elements in a row and the clock signal ck5 determining the row drive.

Figure 3:
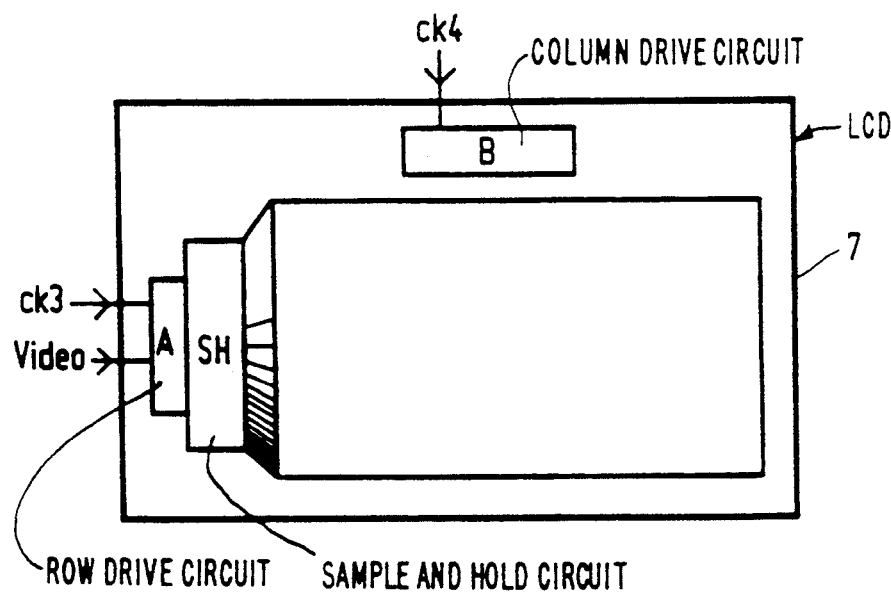
FIG. 3 shows the display screen with a row driver and a column driver.

During the period when the second field is read into the memory 4, the video information stored in the memory 3 is vertically read out of the memory 3 (see the dot-dash line in FIG. 2A) under the control of clock signals ck2 and ck6 via a switch S2, a switching contact c of which is coupled to the memory during this field. The clock signal ck2 determines the allocation of the memory elements in a column and the clock signal ck6 determines the column drive. The master contact of the switch S2 is connected to a D/A converter 5 which converts the (digital) samples into an analog signal under the control of the clock signal ck2. This analog signal is subsequently applied to the drive unit of the LCD screen 7 via a low-pass filter 6. The drive unit of the LCD screen comprises a row drive circuit A (see FIG. 3), which receives the analog video signal and takes samples of the video signal under the control of a clock signal ck3. Each sample is applied to a sample-and-hold circuit SH (see FIG. 3). After all elements of a column have been applied to a sample-and-hold circuit, the column is written as a whole on the LCD screen under the control of a column drive circuit B (see FIG. 3). A clock signal ck4 defines the instant when the relevant column is written.

The switches S1 and S2 and the memories 3 and 4 (under the control of ck1, ck2, ck5 and ck6) jointly constitute a scan-conversion circuit AOS. This scan-conversion circuit reads in the video information horizontally and line by line (row by row) and reads out the video information vertically and column by column.

The inputs 1b and 1c of the display device are coupled to a clock generator 8. With reference to the incoming synchronizing signals Hsync and Vsync the clock generator defines the format of the video signal and thus the required values of the clock signals ck1, ck2, ck3, ck4, ck5 and ck6 for reading the video information into the memories in the correct manner and for subsequently reading it out of the memories again and for displaying it on the LCD screen.

The horizontal synchronizing signal indicates whether the incoming video signal has 625 lines, 525 lines, 1250 lines or a different line number. The vertical synchronizing signal indicates whether the incoming video signal has a picture frequency of 50 Hz, 60 Hz, 100 Hz or a different picture frequency. Together, these synchronizing signals indicate whether the video information comprises pictures in accordance with the PAL, NTSC or HDTV standard or a different standard.

The required number of rows of the memories is equal to the number of effective lines to be displayed of a field of the incoming video signal. The required number of columns of the memories is equal to the number of columns of the LCD display screen.

By reading the fields into the memories horizontally and line by line and by subsequently reading them out vertically and line by line it is possible to use the same display screen for pictures in accordance with, for example, both the PAL and the NTSC standard. Moreover, the width of the picture can be varied by varying the sampling frequency, the starting moment and the sampling period of the clock signal ck1 during reading into the memories.

Furthermore, the height of the picture can be varied by varying the frequency of the clock signal ck2 for reading out the memories and by varying the first position which is read out. For example, when a 9:16 display screen is used, a 3:4 video signal can be enlarged to a 9:16 picture, in which the upper and lower parts of the picture are lost, however. Moreover, 3:4 pictures of cinematographic picture format with a black bar at the upper and lower sides can be enlarged to a full 9:16 picture.

When a CCD (Charged Coupled Device) is used, the A/D converter and the D/A converter may be dispensed with because the video information is stored in the form of charges on capacitors in a CCD.

Instead of using two memories it is alternatively possible to use one (large) memory in a practical embodiment in which one section is used as "first memory" and a second section is used as "second memory" in the case of a correct addressing.

It is further possible to use one picture memory instead of two field memories, the first field being stored in the rows 1, 3, 5, etc. and the second field being stored in the rows 2, 4, 6, etc. Subsequently, the complete memory is read out vertically and a filter operation must be performed, for example, by means of a median filter as described in European Patent Application EP-A-0,192,292. The median filter corrects possible motion errors. This method provides the possibility of obtaining a higher resolution than in the field-sequential vertical read-out mode.

A part of the picture can be enlarged ("zoom") by firstly increasing the frequency of the read clock ck1 during reading into the memory and, secondly, by increasing the sampling frequency ck3 at the display screen.

Normally (in the case of horizontal line display) each video line is presented as a whole to the column (video) driver. These lines are then written one by one into the display under the control of the row selection driver. The video information is then vertically read out of the memory. By applying the video information to the row driver and by using the column driver for selecting the columns, it is possible to economize on memory space which would otherwise be required to store the video information "at the display screen" in a memory again.

The number of rows and columns of the LCD display screen is optional. These numbers are not bound to any television standard. The number of pixels of the LCD screen can be chosen on the basis of invisibility of individual pixels and need not be chosen on the basis of a television standard.

The frequencies of the different clock signals do not need to have a strict relationship with the incoming video information. In the embodiments described hereinbefore the field frequency is chosen to be equal to the field frequency of the incoming video information. The frequencies of the clock signals should only be chosen in such a way that all pixels in each field are provided with new information. Missing lines (due to interlacing) are interpolated in known manner.

For the operation of the display devices according to the invention it is not important whether the video information is applied to the input 1a in the form of RGB signals or in the form of YUV signals.

I claim:

1. A multi-standard display device for displaying pictures having a television-standard-dependent format, which device comprises a matrix display screen, a video-signal processing circuit for receiving and processing the pictures, said pictures having a format-associated number of lines in a first direction, a sync separator for determining horizontal and vertical synchronizing signals, and a standard-conversion circuit for converting the pictures of the television-standard-dependent format into pictures having a display-screen-associated format, characterized in that the standard-conversion circuit comprises a scan-conversion circuit for converting pictures having lines in the first direction into lines in a second direction perpendicular to the first direction, said second-direction lines being applied to the display screen and being displayed in the second direction under the control of a control circuit.

2. A multi-standard display device as claimed in claim 1, characterized in that the scan-conversion circuit comprises a memory which reads in the pictures line by line in the first direction under the control of a first clock signal and reads them out in the direction perpendicular to the first direction under the control of a second clock signal.

3. A multi-standard display device as claimed in claim 2, characterized in that the control circuit comprises a row driver and a column driver, said row driver receiving the video information in an analog form with lines in the second direction, a third clock signal controlling said row driver and a fourth clock signal controlling said column driver.

4. A multi-standard display device as claimed in claim 3, characterized in that the memory is also controlled by a fifth and a sixth clock signal, the fifth clock signal determining the line drive in the first direction of the memory and the sixth clock signal determining the line drive in the second direction of the memory.

5. A multi-standard display device as claimed in claim 2, characterized in that the scan-conversion circuit comprises first and second memories, the pictures being read into the first memory in the first direction while they are being read out of the second memory in the second direction.

6. A multi-standard display device as claimed in claim 2, characterized in that the pictures are read into the memory via an A/D converter and read out of the memory via a D/A converter.

7. A multi-standard display device as claimed in claim 6, characterized in that the A/D converter is controlled by the first clock signal and the D/A converter is controlled by the second clock signal.

8. A multi-standard display device as claimed in claim 2, characterized in that said device comprises a clock generator for generating the clock signals in dependence upon received horizontal and vertical synchronizing signals.

* * * * *